(12) United States Patent
Peterson (10) Patent No.: US 8,131,925 B2
(45) Date of Patent: *Mar. 6, 2012

(54) RUNTIME MACHINE SUPPORTED METHOD LEVEL CACHING

(75) Inventor: Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,272

(22) Filed: Jan. 24, 2011

(65) Prior Publication Data

US 2011/0119659 A1   May 19, 2011

Related U.S. Application Data

(63) Continuation of application No. 11/773,462, filed on Jul. 5, 2007, now Pat. No. 7,949,826.

(51) Int. Cl.
*G06F 12/00* (2006.01)
*G06F 21/00* (2006.01)
*G06F 13/00* (2006.01)
*G06F 13/28* (2006.01)
*G06F 9/26* (2006.01)
*G06F 9/34* (2006.01)
*G06F 9/455* (2006.01)

(52) U.S. Cl. ............ 711/113; 711/6; 711/118; 711/216; 711/E12.001; 718/1

(58) Field of Classification Search .............. 711/6, 113, 711/118, 216; 718/1
See application file for complete search history.

(56) References Cited

U.S. PATENT DOCUMENTS

| 4,755,930 | A  | 7/1988  | Wilson, Jr. et al. |
| 5,940,619 | A  | 8/1999  | Abadi et al. |
| 6,311,253 | B1 | 10/2001 | Chang et al. |

(Continued)

FOREIGN PATENT DOCUMENTS

EP   1316883   6/2003

OTHER PUBLICATIONS

"A Formal Architecture for Open Systems"; Xiaobin Li, Dr. Walt Scacchi; Institute for Software Research, Information and Computer Science Department, University of California, Irvine; Dec. 30, 2001. 2001 http://www.ece.uci.edu/~xiaobinl/OpenSource.pdf.*

(Continued)

*Primary Examiner* — Michael Alsip
(74) *Attorney, Agent, or Firm* — David A. Mims, Jr.; Amy J. Pattillo (57) ABSTRACT

A computer system includes a disk space comprising at least one type of memory and an operating system for controlling allocations and access to the disk space. A runtime machine runs applications through at least one of the operating system or directly on at least one processor of the computer system. In addition, the runtime machine manages a selected runtime disk space allocated to the runtime machine by the operating system and manages a separate method cache within the selected virtual disk space. The virtual machine controls caching within the method cache of a separate result of at least one method of the application marked as cache capable. For a next instance of the method detected by the runtime machine, the runtime machine accesses the cached separate result of the method in lieu of executing the method again.

19 Claims, 5 Drawing Sheets

U.S. PATENT DOCUMENTS

| | | | |
|---|---|---|---|
| 6,385,764 | B1 | 5/2002 | Blandy et al. |
| 6,408,384 | B1 | 6/2002 | Adams |
| 6,587,937 | B1 | 7/2003 | Jensen et al. |
| 6,874,066 | B2 | 3/2005 | Traversat et al. |
| 7,111,286 | B2 | 9/2006 | Schrader et al. |
| 2002/0035672 | A1 | 3/2002 | Challenger et al. |
| 2002/0144019 | A1 | 10/2002 | Gooding |
| 2002/0147887 | A1 | 10/2002 | Copeland et al. |
| 2002/0188801 | A1 | 12/2002 | Green |
| 2003/0005228 | A1 | 1/2003 | Wong et al. |
| 2003/0110478 | A1 | 6/2003 | Duesterwald et al. |
| 2004/0040029 | A1 | 2/2004 | Debbabi et al. |
| 2004/0123277 | A1 | 6/2004 | Schrader et al. |
| 2004/0181401 | A1 | 9/2004 | Pachet et al. |
| 2005/0066306 | A1 | 3/2005 | Diab |
| 2005/0257007 | A1 | 11/2005 | Moore et al. |
| 2009/0013128 | A1 | 1/2009 | Peterson |
| 2009/0013320 | A1 | 1/2009 | Peterson |

OTHER PUBLICATIONS

U.S. Appl. No. 11/773,462, filed Jul. 5, 2007, USPTO Final Office Action, mailing date Oct. 14, 2010, 23 pages.

Daniel Pfiefer and Peter Lockemann, "Theory and Practice of Transactional Method Caching", ACM Transactions on Programming Languages and Systems, vol. 2, Sep. 14, 2006, pp. 1-36, 36 pages.

Bakalova, R., et al., "WebSphere Dynamic Cache: Improving J2EE application performance", IBM Systems Journal, vol. 43, No. 2, 2004, pp. 351-370, 20 pages.

U.S. Appl. No. 11/773,462, filed Jul. 5, 2007, USPTO Office Action, mailing date May 12, 2010, 72 pages.

U.S. Appl. No. 11/773,462, filed Jul. 5, 2007, USPTO Notice of Allowance, mailing date Jan. 11, 2011, 6 pages.

"How to Get Started with IBM WebSphere Application Server on Solaris 10 and Zones", Dileep Kumar and Albert Leigh, Sun Microsystems Inc, May 24, 2006, pp. 1-23.

"Explained: How does Java work?" Issue of Red Herring Magazine, Mar. 6, 2001, http://www.redherring.com/home/6264.

"How Websphere Caches Dynamic Content for High-Volume Web Sites", High-Volume Web Site Team, Dec. 15, 2002, p. 1-18.

Guest, S "Using Reflection Emit to Cache .NET Assemblies", Feb. 2002, Microsoft Corporation [retrieved on Jan. 26, 2011]. Retrieved from the Internet <URL:http://msdn.microsoft.com/en-us/library/ms973916.aspx>.

Office Action, U.S. Appl. No. 11/773,463, filed Jul. 5, 2007, Robert R. Peterson, mailing date Mar. 3, 2011.

Final Office Action, U.S. Appl. No. 11/773,463, filed Jul. 5, 2007, Robert R. Peterson, mailing date Jul. 18, 2011, 27 pages.

International Search Report and Written Opinion, PCT/EP2008/057202, International Business Machines Corporation, Jun. 11, 2006, 9 pages.

Notice of Allowance, U.S. Appl. No. 11/773,463, filed Jul. 5, 2007, Robert R. Peterson, mailing date Oct. 26, 2011, 16 pages.

* cited by examiner

```
                                        404
public class OrderDetails implements CACHECAPABLE {
private String name;
private int price;
private long quantity;
...
}
```
402

```
            408
@CACHECAPABLE
public class OrderDetails {
private String name;
private int price;
private long quantity;
...
}
```
406

RUNTIME MACHINE SUPPORTED METHOD LEVEL CACHING

CROSS-REFERENCE TO RELATED APPLICATIONS

This application is a continuation of commonly assigned U.S. patent application Ser. No. 11/773,462, filed Jun. 5, 2007, which is hereby incorporated herein by reference.

BACKGROUND OF THE INVENTION

1. Technical Field

The present invention relates in general to an improved runtime machine such as a virtual machine or interpreter. Still more particularly, the present invention relates to an improved runtime machine for supporting method level caching.

2. Description of the Related Art

One consideration in application development is how to achieve performance requirements for an application across multiple hardware and software platforms. For many applications, caching data can significantly improve the performance of response times by saving computed results in a cache, associating the saved results with properties of the request, and obviating computations for subsequent similar requests by serving responses from the cache. In particular, enhanced performance may be achieved for object-oriented programming language applications by caching the outputs of methods, such as by caching a hash table generated when a method is run.

To improve the performance of applications across multiple platforms, many applications today are written to run on cross-platform runtime machines, such as virtual machines and interpreters. Examples of virtual machines include, but are not limited to Java Virtual Machine (JVM) (Java and JVM are registered trademarks of Sun Microsystems, Inc.) and Common Language Runtime (CLR). Examples of interpreters include, but are not limited to, PERL and PYTHON. Different versions of a runtime machine are written for various computer platforms, running various operating systems, where any application written for the runtime machine can be operated on any of the platforms, instead of a developer having to produce a separate version of the application for each computer and operating system.

Typically, for a runtime machine to run atop the operating system or hardware platform and execute an application, the runtime machine requests a portion of the cache heap from the operating system and manages the allocated portion of the cache heap. Currently, however, cache management by runtime machines does not include programming language support for caching data at the method level. Thus, to implement method level caching for applications written to run on a runtime machine, users are limited to writing custom code for a particular platform to manually store results of methods in the cache, such as by manually maintaining hash maps, or users are limited to writing applications to run through an additional layer of software with specialized libraries or APIs which control caching, where the additional layer of software runs atop the runtime machine.

Requiring a user to customize code for a platform for manual caching or to implement an additional software layer which supports method level caching, however, overlooks the goal of reusability of one version of an application across multiple platforms running on top a runtime machine at each platform. A user may write customized code to manually control method level caching based on the cache size, cache scheme and cache coherence for one platform, but for a different platform the code would have to be rewritten to provide enhanced performance on that platform. Further, a user may write customized code with caching commands for method level caching supported by a specialized software layer, but then for the application to run on a particular platform, that additional software layer is required in addition to the runtime machine.

Therefore, there is a need for a method, system, and program for supporting fine-grained, method level caching through a runtime machine, in the portion of the cache heap allocated to the runtime machine. In addition, there is a need for an interface through which a user may select, during runtime, whether to direct the runtime machine to cache the output of a particular method.

SUMMARY OF THE INVENTION

Therefore, the present invention provides, in general, an improved runtime machine, such as a virtual machine or interpreter, which supports caching of method results.

In one embodiment, a computer system includes a disk space comprising at least one type of memory and an operating system for controlling allocations and access to the disk space. A runtime machine includes a virtual machine controller or interpreter controller to run applications through at least one of the operating system or directly on at least one processor of the computer system. In addition, the runtime machine manages a selected virtual disk space allocated to the runtime machine by the operating system and manages a separate method cache within the selected virtual disk space. The runtime machine controls caching within the method cache of a separate result of at least one method of the application marked as cache capable. For a next instance of the method detected by the runtime machine, the runtime machine accesses the cached separate result of the method in lieu of executing the method again.

The runtime machine may detect whether a method is cache capable by analyzing the application code for an application for a marking identifying the method within the application code as cache capable, where the marking includes one of a tagged interface, an annotation, or a class-level modifier. A developer or the runtime machine may mark a method as cache capable in the application code.

In addition or alternatively, the runtime machine may detect whether a method within the application code is cache capable by analyzing the method at runtime to determine whether the method is a candidate for caching. In particular, the runtime machine analyzes each method to determine whether all the arguments of the method are cacheable. If all the arguments of the method are cacheable, then the runtime machine marks the method as cache capable within the application code. When the runtime machine is implemented with an interpreter controller, the application code represents source code which is interpreted by the interpreter controller at runtime. When the runtime machine is implemented with a virtual machine controller, the application code at runtime represents bytecode which a compiler builds prior to runtime, from the source code of the application. Separately, prior to runtime, if the runtime machine compiles the source code of the application into bytecode, the runtime machine may analyze each method to determine whether the method is suitable for caching and marks each method which is suitable for caching as cache capable within the compiled bytecode for the application.

The runtime machine may also detect whether a method is cache capable through a user selection through a user interface supported by the runtime machine. The runtime machine presents the user via the user interface with a list of methods for the application and the user may select, via the user interface, one or more methods for the runtime machine to mark as cache capable in the application code run by the runtime machine for the application.

In addition, the runtime machine may detect whether a method is cache capable from a separate cache property file accessible separate from the application. The runtime machine accesses the cache property file which specifies a selection of methods for marking as cache capable. The runtime machine marks the selection of methods of the application from the cache property file as cache capable in the application code run by the runtime machine for the application.

In accessing the cached result of a method for a next instance of the method, the runtime machine first performs a hashing function to calculate a hash index for the method using at least one object graph of at least one argument of the method as inputs to the hashing function. The runtime machine searches the method cache with the hash index and upon detecting a cache hit, detects whether the method entry at the hash index is valid. If the method entry at the hash index is valid, then the runtime machine uses the method entry as the result for the method. If the method entry at the hash index valid is not valid, then the runtime machine runs the method and caches the result of the method in the method cache at the hash index location. In addition, if the runtime machine searches the method cache with a hash index and there is a cache miss, the runtime machine runs the method and caches the result of the method in the method cache at the hash index location.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
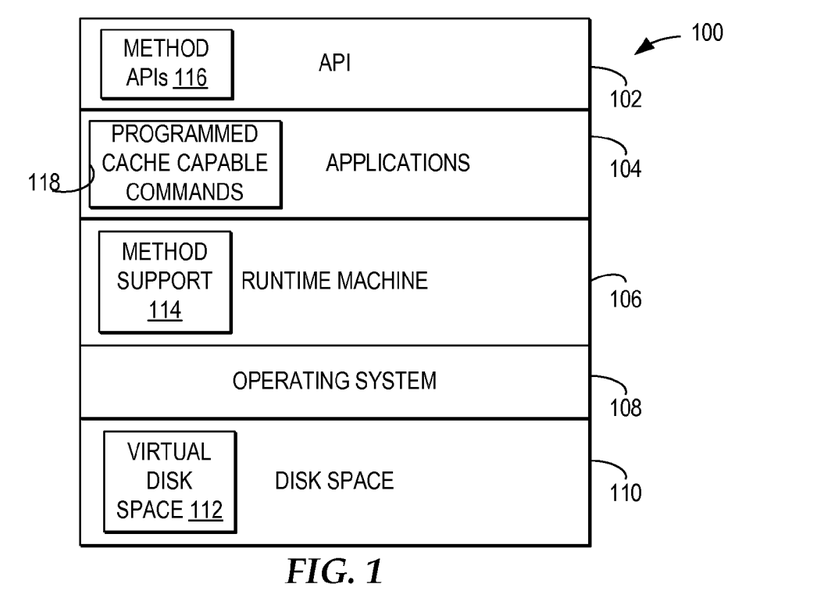
FIG. 1 is a block diagram depicting one embodiment of a stack in which a runtime machine which supports method level caching is implemented.

With reference now to the figures, and in particular, with reference now to FIG. 1, a block diagram illustrates one embodiment of a stack in which a runtime machine which supports method level caching is implemented. In the example, a stack 100 for running on a computer system or a network of computer systems includes a runtime machine 106. Runtime machine 106 provides an environment for running applications 104 through an operating system 108 or directly on a processor of a computer system (not depicted). It is important to note that as used herein, runtime machine 106 implements a virtual machine or interpreter, such as, but not limited to, virtual machines such as a Java Virtual Machine (JVM) (Java and JVM are registered trademarks of Sun Microsystems, Inc.) or Common Language Runtime (CLR), and interpreters such as PERL or PYTHON. Applications 104 include application code written in object-oriented programming languages supported by runtime machine 106, wherein the application code of applications 104 can run on different computer platforms through a different runtime machine specified for the each of the different platforms. As described herein, application code may refer to, but is not limited to, the source code of an application, compiled bytecode from the source code, executed bytecode or interpreted source code. Applications 104 may also include middleware, such as Websphere (Websphere is a registered trademark of International Business Machines Corporation) or other service software layers atop which applications can run, and which runtime machine 106 views as an application.

Operating system 108 interfaces with disk space 110, which may include cache. In one embodiment, operating system 108 allocates a portion of disk space 110 specifically for management by runtime machine 106, as illustrated by virtual disk space 112, which may also be referred to as the heap or cache allocated to runtime machine 106. Runtime machine 106 controls cache allocations and data storage within the virtual disk space 112. In addition, in controlling caching within the virtual disk space 112, runtime machine 106 may also control garbage collection or other cache management to periodically remove unused or expired data or to rearrange data to create larger blocks of unused space for allocation. Virtual disk space 112 may include either or both of physical representations and logical representations of disk space 110, An application programming interface (API) layer 102 provides libraries and support through which applications 104, runtime machine 106, and operating system 108 may communicate with a user. API layer 102 may include API libraries packaged with runtime machine 106 for enabling a user interface through which a user may select operation parameters for runtime machine 106.

Advantageously, runtime machine 106 supports method level caching. As described herein, a "method" is used in object-oriented programming to refer to a programmed procedure which is defined as part of a class or included in any object of the class. In addition, other types of object-oriented methods may be implemented. It will be understood that runtime machine 106 may also support caching of other types of methods.

In the example, to support method level caching, runtime machine 106 includes a method support layer 114 which enables runtime machine 106 to determine whether a method is suitable for caching, to control caching of the results of cache capable methods to virtual disk space 112, and to control accesses to previously cached results of a method from virtual disk space 112.

In one example, in determining whether a method is suitable for caching, method support layer 114 directs runtime machine 106 to analyze application code for applications 104 and separate cache property files, accessible separate from application code, to detect whether a method has been marked as cache capable within the code or in the separate cache property file. In particular, method support layer 114 may include a library that defines language commands for marking a method as cache capable and for specifying an amount of time that the result of the method is valid when cached. Thus, applications 104 may include application source code that includes programmed cache capable commands marking cache capable methods or a separate cache property file may designate one or more cache capable methods, as illustrated at reference numeral 118.

In another example, in determining whether a method is suitable for caching, method support layer 114 may direct runtime machine 106 to analyze application code for applications 104 to decide whether a method is cache capable. In addition, method support layer 114 may enable runtime machine 106, responsive to analyzing application code and deciding that a method is suitable for caching, to add commands to the application code to specify the particular method as cache capable.

In a further example, in determining whether a method is suitable for caching, runtime machine 106 may be packaged with method APIs 116 in API layer 102. Runtime machine 106 may call method APIs 116 to prompt a user to select whether a method is cache capable, whether to cache a cache capable method, how long to cache a cache capable method, and other parameters of method level caching supported by method support layer 114.

Figure 2:
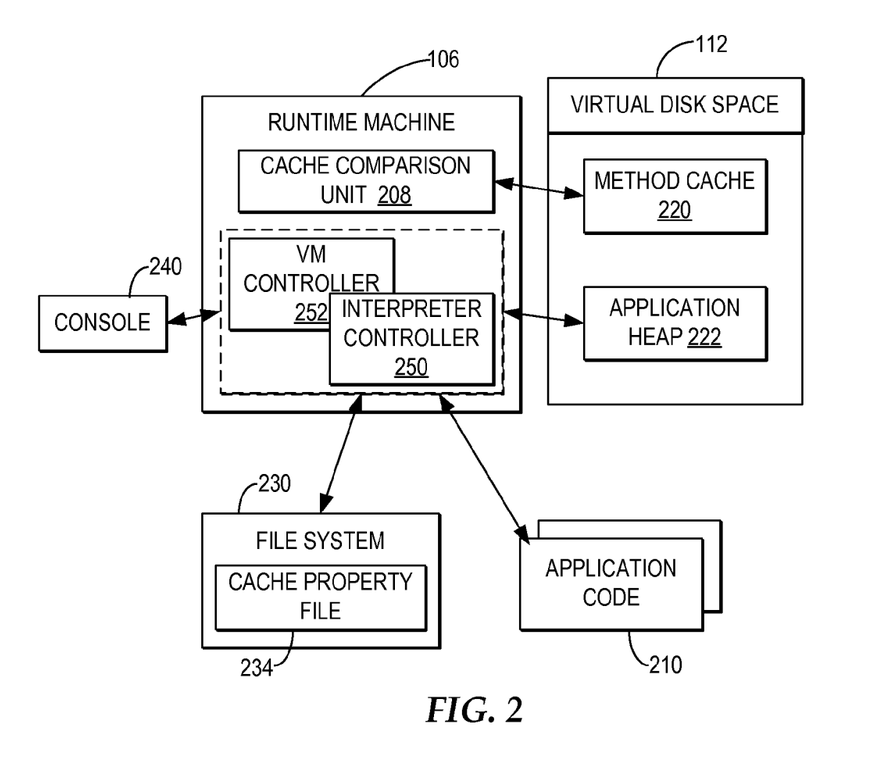
FIG. 2 is a block diagram illustrating one embodiment of a runtime machine for controlling method level caching within the cache managed by the runtime machine.

Referring now to FIG. 2, a block diagram depicts one embodiment of a runtime machine for controlling method level caching within the cache managed by the runtime machine. It will be understood that in other embodiments, additional or alternate components may be implemented by a runtime machine for controlling method level caching.

Runtime machine 106 controls the execution of application code 210 of applications 104. In one example, runtime machine 106 may include a virtual machine (VM) controller 252, where virtual machine controller 252 compiles source code of application code 210 into binary instructions, also referred to as bytecode, and executes the bytecode at runtime on operating system 108 or directly on a processor. In another example, application code 210 may represent bytecode already compiled by a virtual machine compiler. Further, in another example, runtime machine 106 may implement an interpreter 250, where application code 210 represents source code for an interpreted language which interpreter controller 250 translates and executes at runtime on operating system 108 or directly on a processor. It is important to note that runtime machine 106 is described herein as implementing either virtual machine controller 252 or interpreter controller 250, however, in another example, runtime machine may implement both virtual machine controller 252 and interpreter controller 250 or may implement multiple instances of one or more of virtual machine controller 252 and interpreter controller 250.

In the example, virtual disk space 112 includes an application heap 222 managed by runtime machine 106 from operating system 108 for one or more applications. In addition, in the example, virtual disk space 112 includes a method cache 220 allocated by runtime machine 106 from operating system 108 for caching method results.

According to an advantage, runtime machine 106 supports method level caching by determining when a method is suitable for caching in method cache 220, and, if the method is cache capable, passing the method to cache comparison unit 208. As previously noted with respect to FIG. 1, runtime machine 106 may determine whether a method is suitable for caching at one or more points in handling application code.

In particular, in one example, in determining whether a method is suitable for caching, an application developer may specify suitability by marking particular methods as cache capable within source code 210. In one example, virtual machine controller 252 detects methods marked as cache capable within compiled bytecode of application code 210. In another example, as interpreter controller 250 executes the source code of application code 210, interpreter controller 250 detects those method marked as cache capable.

Figure 4:
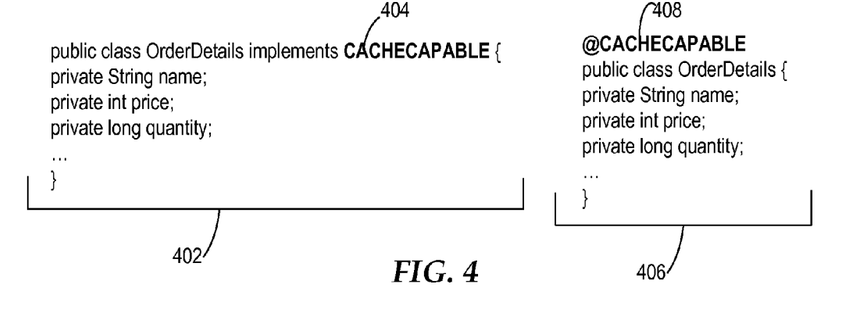
FIG. 4 is an illustrative diagram of examples of methods within application code marked as cache capable.

In the example, within an object-oriented programming language based application, a developer may select to mark specific methods as cache capable within the source code by marking one or more objects or classes of a method, or the method itself, using tags, annotations, or class-level modifiers, for example. In addition, virtual machine controller 252 and interpreter controller 250 may also mark methods as cache capable using tags, annotations, or class-level modifiers. For example, with reference now to FIG. 4, code 402 depicts a method specified as cache capable through the class-level modifier of CacheCapable illustrated at reference numeral 404. In addition, with reference to FIG. 4, code 406 depicts a method specified as cache capable through an annotation of "@CacheCapable" as illustrated at reference numeral 408.

In another example, in determining whether a method is suitable for caching, virtual machine controller 252 or interpreter controller 250 determine at runtime that a method is a candidate for caching by checking each argument of the method and each object graph the method returns to determine if the method includes all cache capable objects. If the arguments of a method and returned result are all cache capable, then virtual machine controller 252 or interpreter controller 250 mark the method as cache capable and pass the method to cache comparison unit 208. In one example, in determining whether a method is cache capable, virtual machine controller 252 or interpreter controller 250 detect any primitive types of arguments, such as "int" or "string", as cache capable, but detects any non-primitive types of arguments, such as another object's file handle or connection to a file system, such as file system 230, as not cache capable.

In yet another example, in determining whether a method is suitable for caching, virtual machine controller 252 determines prior to runtime, during compilation of the source code of application code 210 into bytecode, whether each method should be cached and annotates within the bytecode those methods which are cache capable. In particular, it is important to note that virtual machine controller 252 may perform statistical analysis of method arguments and return objects of the compiled source code to determine whether to mark a method as cache capable.

In addition, in another example, in determining whether a method is suitable for caching, a cache property file 234 may include global cache capable settings. In one example, cache property file 234 may specify one or more particular methods as cache capable. In another example, cache property file 234 may specify one or more types of methods, or types of objects or classes, as cache capable. Further, cache property file 234 may specify one or more methods which should be cached with priority over other methods. In addition, it will be understood that cache property file 234 may include additional or alternate types of cache settings, including settings for the size of virtual disk space 112, settings for the size of method cache 220, settings for the maximum method return result to be cached in method cache 220, and settings for turning off method level caching. Further, cache property file 234 may also include methods marked as not cache capable, even though the method would be a candidate for caching or may be marked as cache capable within the coding of the application.

At runtime, virtual machine controller 252 or interpreter controller 250 of runtime machine 106 may access cache property file 234 or during compilation VM controller 252 may access cache property file 234, to detect designated cache capable methods. In the example, cache property file 234 is an XML file stored at a particular address within a particular location within file system 230. In other embodiments, the file type and locations for storing cache property file 234 may vary. In addition, in other embodiments, runtime machine 106 may access cache property file from a storage device other than file system 230. Further, in other embodiments, runtime machine 106 may access multiple cache property files from multiple locations within file system 230 or distributed across multiple file systems. Moreover, an application or runtime machine 106 may include a cache property file bundled with the application or runtime machine and installed within file system 230 when the application or runtime machine is installed or run.

Moreover, in determining whether a method is suitable for caching, runtime machine 106 may call method level APIs 116 to prompt a user, via a console 240 to analyze and select the cacheable setting for a method. For example, runtime machine 106 may prompt a user via console 240 with a list of each detected methods within application code 210, wherein the user may designate whether each method is cache capable. In another example, runtime machine 106 may prompt a user via console 240 with a list of each detected method marked within the code as cache capable, wherein the user may designate whether a particular cache capable method should be cached during runtime. In addition, runtime machine 106 may provide the user, via console 240 with information indicating current cache allocations to virtual disk space 112, percentage of memory heap 220 in use, and other cache statistics, wherein a user may request adjustment of the allocation amounts.

In one embodiment, cache property file 234 specifies the selection of method level APIs 116 to be called to present a user with method level cache information and selections. In addition, in one embodiment, as a user makes selections via console 240, method level APIs 116 are called which update cache property file 234 with the user selections.

During runtime, virtual machine 252 or interpreter 250 of runtime machine 106 detect a cache capable method and pass execution control of the method to cache comparison unit 208. As previously noted, virtual machine controller 252 or interpreter controller 250 may detect application code 210 already marked with cache capable methods at compile time or by a developer, interpreter controller 250 or virtual machine controller 252 may analyze application code 210 at runtime and mark cache capable methods, virtual machine controller 252 may analyze application code 210 at compile time and mark cache capable methods, interpreter controller 250 or virtual machine controller 252 may detect a method selected to be cache capable in cache property file 234, or interpreter controller 250 or virtual machine controller 252 may detect a user selection during runtime for a method to be cache capable. In addition, interpreter controller 250 or virtual machine controller 252 may detect that a user selection during runtime via console 240 or a specification in cache property file 234 overrides developer specifications for methods. For example, a method specified as cache capable in application code 210 may be overridden by a setting in cache property file 234 specifying that the method is not cache capable.

Cache comparison unit 208 supports method level caching by searching method cache 220 for previously stored results of a method, storing results of a method, and managing how long method results are cached. In addition, it will be understood that cache comparison unit 208 may perform additional functions in managing virtual disk space 112 and analyzing methods to determine whether a method is cache capable.

In one embodiment, upon receiving execution control of a cache capable method, cache comparison unit 208 implements a hash function to return a hashvalue, using the object graphs of each argument to the cache capable method as inputs. Next, cache comparison unit 208 searches method cache 220 using the determined hashvalue as an index. It will be understood that additional or alternate types of functions may be implemented to calculate an index into the cache to determine whether there is a cache hit or cache miss for a method.

If cache comparison unit 208 detects a cache miss for the hashvalue in method cache 220, then cache comparison unit executes the method and caches the result in method cache 220. Otherwise, if cache comparison unit detects a cache hit for the hashvalue in method cache 220, cache comparison unit 208 inspects the timestamp for the cache entry in method cache 220 to determine if the cache entry is stale because the amount of time passed since the timestamp exceeds a timeout setting for the method. If the cache entry is stale, cache comparison unit executes the method and caches the result in method cache 220. If the cache entry is not stale, then cache comparison unit 208 uses the cached result from method cache 220.

Figure 5:
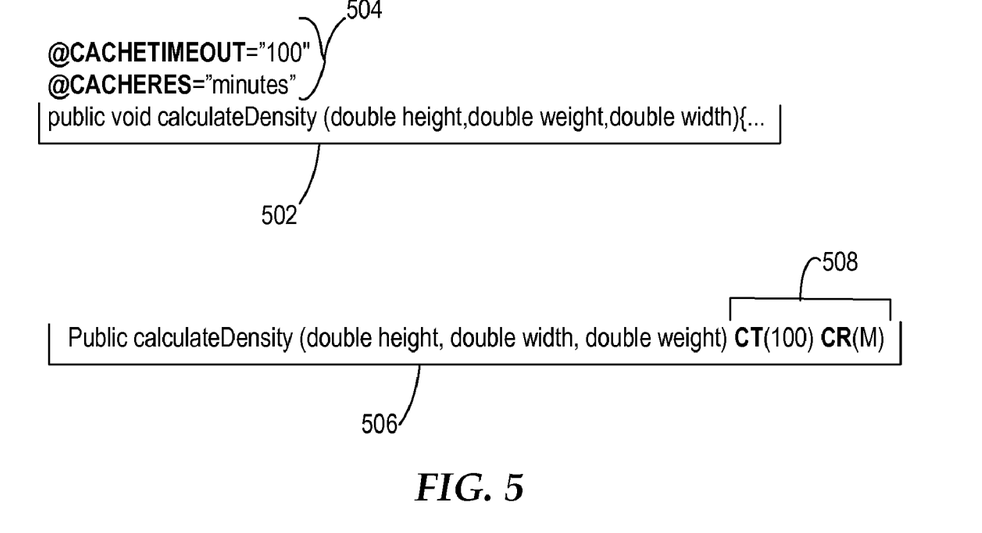
FIG. 5 is an illustrative diagram of examples of methods within application code marked with a timeout setting for a length of time a cached result of the method is valid.

In determining whether a method entry is stale, the timeout setting for the method may be specified in the method code using an annotation or keyword, for example. For example, with reference now to FIG. 5, code 502 depicts an object with an annotation illustrated at reference numeral 504 specifying a method level cache timeout of "@CacheTimeout="100"" and "@CacheRes="min"" to specify a timeout of 100 minutes. In code 506, additional keywords illustrated at reference numeral 508 "CT(100)" and "CR(M)" specify a method level cache timeout of 100 minutes. It is important to note that while the examples of timeout settings in FIG. 5 illustrate timeout settings in minutes, other increments of time may be set.

A developer may specify the timeout settings for methods when coding the application. In addition, if runtime machine 106 modifies a method entry as cache capable, interpreter controller 250 or virtual machine controller 252 may access cache property file 234 to determine what timeout periods to associate with message entries globally or by object types. Further, cache property file 234 may include global or object level timeout periods which override any timeout periods coded by the developer in the application.

In addition, as to setting the timeout setting for a method, a user may select, via console 240, a timeout setting for a particular method, a selection of methods, and a type of method. In addition, cache property file 234 may specify that a user should be prompted, via console 240, to select whether to extend a timeout setting which has expired, for a particular method or type of method.

For a cacheable method, additional control settings may be specified for a particular method or in cache property file 234 based on the operating conditions of the system, such as the processor load, the cache load, the frequency of garbage collection, or other settings. For example, cache property file 234 may specify that if runtime machine 106 is performing garbage collection at a frequency which exceeds a particular threshold, then the timeout settings for a particular method or type of method should be adjusted.

Figure 3:
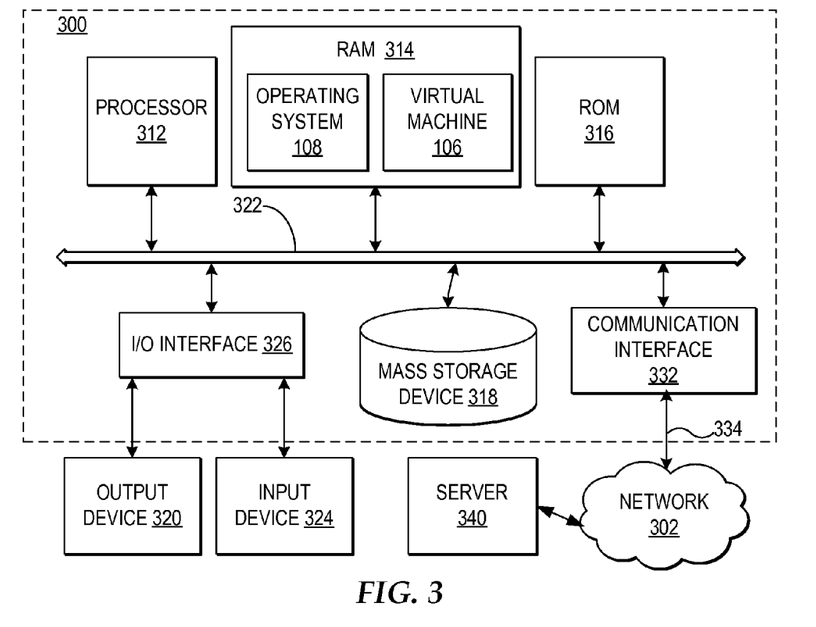
FIG. 3 is a block diagram depicting a computer system in which the present invention may be implemented.

With reference now to FIG. 3, a block diagram illustrates a computer system in which the present invention may be implemented. The controllers and systems of the present invention may be performed in a variety of systems, including a variety of computing systems, such as computer system 300, communicatively connected to a network, such as network 302.

Computer system 300 includes a bus 322 or other communication device for communicating information within computer system 300, and at least one processing device such as processor 312, coupled to bus 322 for processing information. Bus 322 preferably includes low-latency and higher latency paths that are connected by bridges and adapters and controlled within computer system 300 by multiple bus controllers. When implemented as a server, computer system 300 may include multiple processors designed to improve network-servicing power. Where multiple processors share bus 322, an additional controller (not depicted) for managing bus access and locks may be implemented.

Processor 312 may be a general-purpose processor such as IBM's PowerPC™ processor that, during normal operation, processes data under the control of an one or more layers described in stack 100, including but not limited to, operating system 108 and runtime machine 106, and other code accessible from a dynamic storage device such as random access memory (RAM) 314, a static storage device such as Read Only Memory (ROM) 316, a data storage device, such as mass storage device 318, or other data storage medium.

Figure 7:
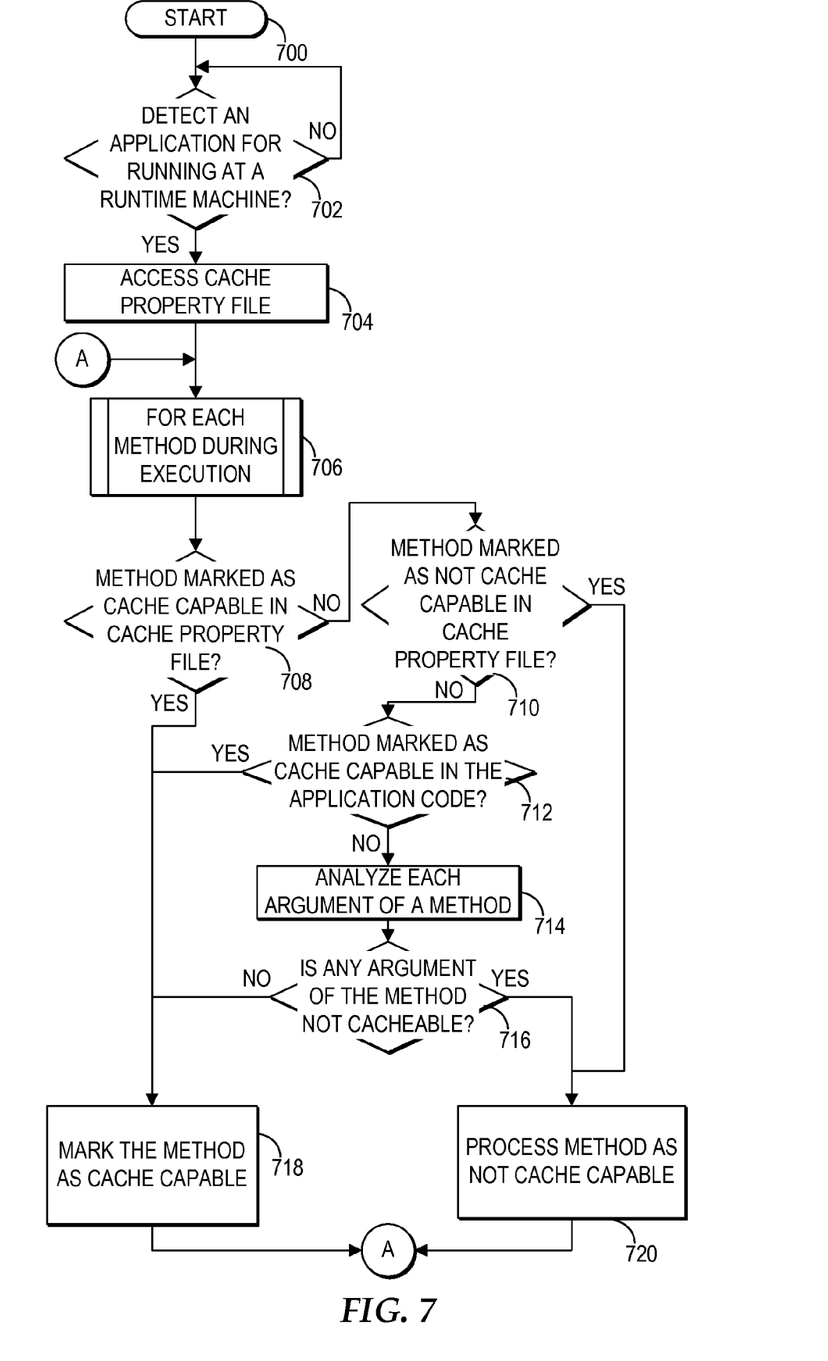
FIG. 7 is a high level logic flowchart illustrating a process and program for a runtime machine running application code which includes cache capable methods.
Figure 8:
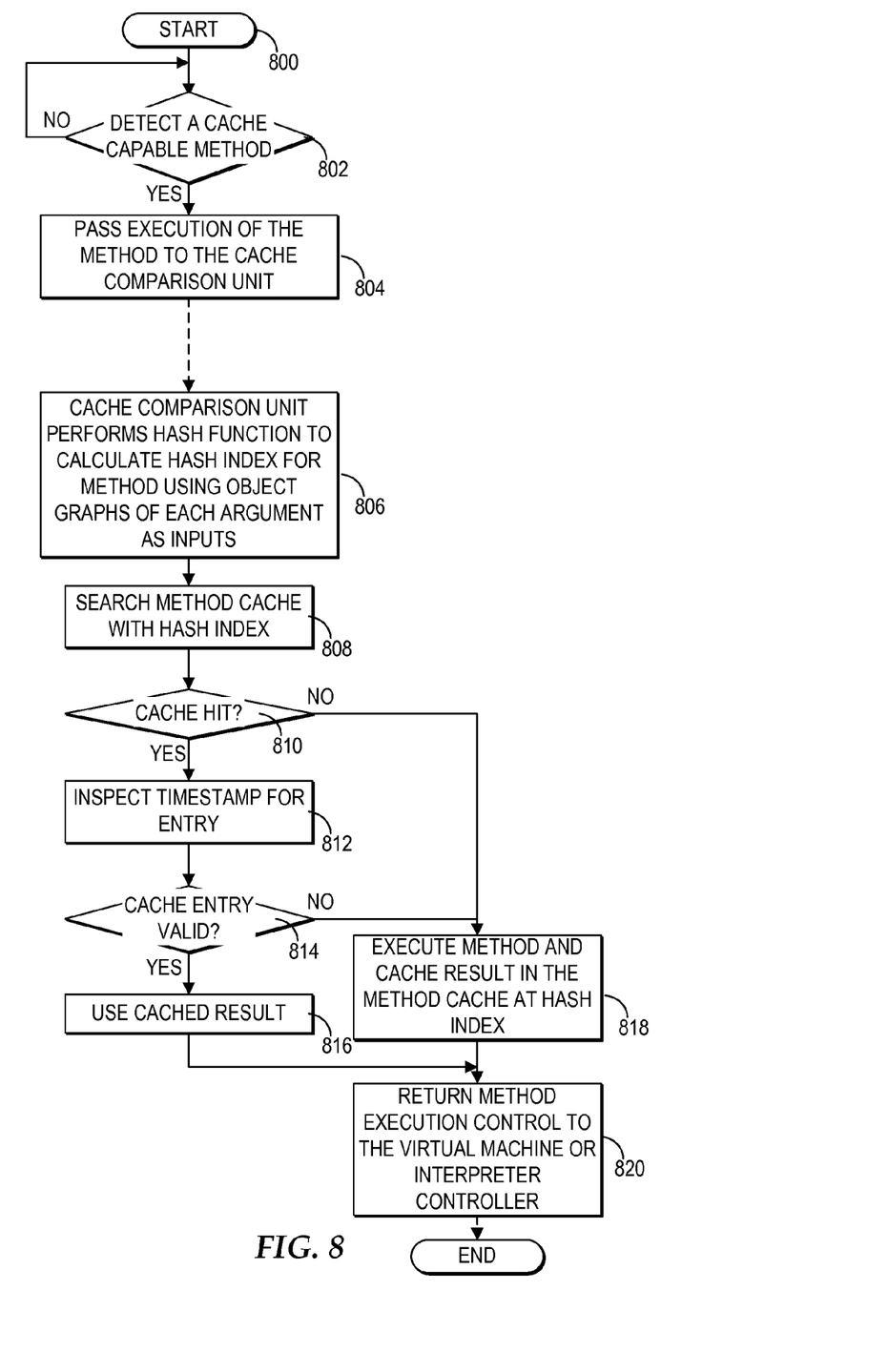
FIG. 8 is a high level logic flowchart depicting a process and program for a runtime machine managing execution of a cache capable method.

In one embodiment, the operations performed by processor 312 may control runtime machine support for method level caching, as depicted in the operations of flowcharts of FIGS. 7 and 8 and in other operations described herein. Operations performed by processor 312 may be requested by operating system 108 or runtime machine 106 or other code or the steps of the present invention might be performed by specific hardware components that contain hardwired logic for performing the steps, or by any combination of programmed computer components and custom hardware components.

The runtime machine for supporting method level caching of the present invention may be provided as a computer program product, included on a computer-readable or machine-readable medium having stored thereon the computer-readable program that when run on computer system 300 causes computer system 300 to perform a process according to the present invention. The terms "computer-readable medium" or "machine-readable medium" as used herein includes any medium that participates in providing instructions to processor 312 or other components of computer system 300. Such a medium may take many forms including, but not limited to, storage type media, such as non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip, or any other medium from which computer system 300 can read and which is suitable for storing instructions. In the present embodiment, an example of a non-volatile medium is mass storage device 318, which as depicted is an internal component of computer system 300, but will be understood to also be provided by an external device. Volatile media include dynamic memory such as RAM 314.

Moreover, the function management tool of the present invention may be downloaded or distributed as a computer program product, wherein the program instructions may be transmitted from a remote computer such as a server 340 to requesting computer system 300 by way of data signals embodied in a carrier wave or other propagation medium via network 302 to a network link 334 (e.g. a modem or network connection) to a communications interface 332 coupled to bus 322. In one example, where processor 312 includes multiple processor elements is, a processing task distributed among the processor elements, whether locally or via a network, may represent a consumer program product, where the processing task includes program instructions for performing a process or program instructions for accessing Java (Java is a registered trademark of Sun Microsystems, Inc.) objects or other executables for performing a process. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 302. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 203 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. For example, input device 324 may include, for example, a microphone, a video capture device, a card reader, a body scanning system, a keyboard, a mouse, or other input peripheral device, communicatively enabled on bus 322 via I/O interface 326 controlling inputs. In addition, for example, an output device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention.

Figure 6:
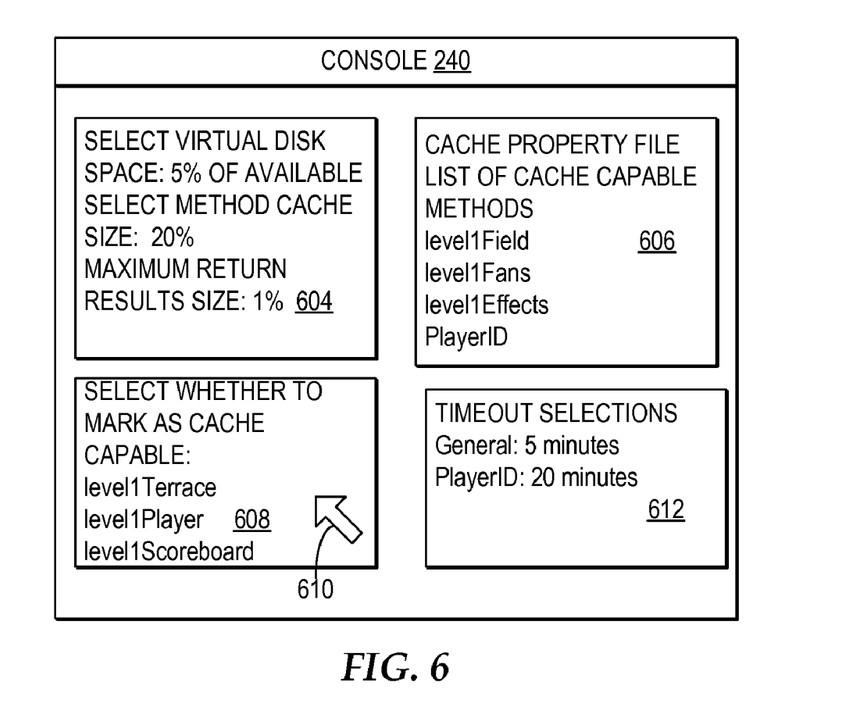
FIG. 6 is a an illustrative diagram depicts one example a user interface through which a user may adjust a cache property file or adjust method level cache settings during runtime of an application.

Referring now to FIG. 6, an illustrative diagram depicts one example a user interface through which a user may adjust a cache property file or adjust method level cache settings during runtime of an application. In the example, an illustration of a user interface for console 240 is depicted. In the example, a user may make selections using the placement of cursor 610 and an input or through other inputs available for selecting among the entries within console 240.

In one illustration of the advantage of runtime machine 106 supporting method level caching, a first developer designs a three-dimensional (3D) multi-player video game engine application to run on runtime machine 106. In a demonstration of the speed of the first developer's 3D engine application against the speed of other 3D engine applications, each of the competing developers is required to run their application on the same set of hardware and on the same runtime machine which supports method level caching, without any middleware. The hardware provided for the competition has less powerful CPU's but more memory than what the first developer used for testing the 3D engine application.

In the example, the first developer, as a user, may determine a percentage of the methods in the application which are the most computationally intensive and mark these methods as cache capable, to take advantage of the increased memory resources. In one embodiment, the user may directly edit cache property file 234 and specify the selection of methods to be marked as cache capable by runtime machine 106. In another embodiment, the user may invoke the user interface illustrated in console 240 and make selections within console 240 which trigger edits to cache property file 234.

In particular, in the example, the user may select to adjust the percentage of virtual disk space from among the available disk space from 5%, the percentage of virtual disk space allocated as method cache from 20%, and the maximum percentage of the cache which can be allocated to a single method result from 1%, as illustrated within selection area 604. During runtime, the user may also select to adjust the allocation percentages in an attempt to increase performance.

In addition, in particular, in the example, the user may view a list of methods which runtime machine 106 detects as cache capable and which the user has selected to mark as cache capable, including classes level1Field, level1Fans, level1Effects, and object playerID, as illustrated at reference numeral 606, and the user may select from a list of methods which runtime machine 106 detects as candidates for caching, but the user has not yet selected to mark as cache capable, including classes level1Terrace, level1Player, and level1Scoreboard. In one example, runtime machine 106 may analyze source code, during compilation into bytecode, and present the user with a list of methods which are candidates for caching from which the user may select which methods to mark as cache capable. In another example, during runtime, as methods run, runtime machine 106 may present methods which are candidates for caching to the user. Further, a user may select to remove a method from the list of cache capable methods illustrated at reference numeral 606, and place the method back in the list illustrated at reference numeral 608.

Further, in particular, in the example, the user may select to adjust the timeout settings for runtime. In the example illustrated at reference numeral 612, the user has selected a general timeout setting of 5 minutes and a particular object setting for the object playerID of 20 minutes. In selecting cacheable methods, although not depicted, the user may assign the timeout setting and other variables for controlling the amount of time that a cached method results remains valid.

By enabling the developer to adjust methods marked as cache capable on the fly and by enabling the developer to adjust methods marked as cache capable via cache property file 234, a developer can quickly adjust an application to run most efficiently on a runtime machine based on the CPU power, memory size, and other hardware characteristics of a platform, without having to actually adjust the code of an application or rely on additional middleware to perform caching functions.

With reference now to FIG. 7, a high level logic flowchart depicts a process and program for a runtime machine running application code which includes cache capable methods. In the example, the process starts at block 700 and thereafter proceeds to block 702. Block 702 depicts a determination whether a runtime machine detects an application to run. When the runtime machine detects an application, then the process passes to block 704. In one example, the runtime machine may detect an application and first compile the source code of the application into bytecode, including cache capable markings in the compiled bytecode, where the runtime controller executes the bytecode at runtime. In another example, the runtime machine may detect an application for execution and interpret and execute the source code of the application at runtime. Although not depicted, a runtime machine, implementing a virtual machine controller or interpreter controller may require additional steps in executing an application.

Block 704 illustrates accessing a cache property file specifying properties of the runtime machine cache and method level caching specifications. Next, block 706 depicts the process performed for each method, during execution. Thereafter, block 708 illustrates a determination whether the method is marked as cache capable in the cache property file. If the method is marked as cache capable in the cache property file, then the process passes to block 718. Block 718 illustrates marking the method as cache capable, and the process returns to block 706.

Returning to block 708, if the method is not marked as cache capable in the cache property file, the process passes to block 710. Block 710 depicts a determination whether the method is specifically marked as not cache capable in the cache property file. If the method is specifically marked as not cache capable in the cache property file, then the process passes to block 720. Block 720 depicts processing the method as not cache capable, and the process returns to block 706.

Returning to block 710, if the method is not specifically marked as not cache capable, then the process passes to block 712. Block 712 illustrates a determination whether a method is marked as cache capable in the application code. If the method is marked as cache capable in the application code, then the process passes to block 718. Otherwise, if the method is not marked as cache capable in the application code, then the process passes to block 714. Block 714 depicts analyzing each argument of a method to determine if the argument is cacheable. Next, block 716 illustrates a determination whether any argument in a method is not cacheable. If any argument is not cacheable, then the process passes to block 720. If all the arguments are cacheable, then the process passes to block 718.

Referring now to FIG. 8, a high level logic flowchart illustrates a process and program for a runtime machine managing execution of a cache capable method. In the example, the process starts at block 800 and thereafter proceeds to block 802. Block 802 depicts a determination whether the virtual machine controller or interpreter controller detects a cache capable method. When the virtual machine controller or interpreter controller detects a cache capable method, then the process passes to block 804. Block 804 illustrates passing execution of the method to the cache comparison unit, and the process passes to block 806.

Block 806 depicts the cache comparison unit performing a hash function to calculate a hash index for the method using the object graphs of each argument of the method as inputs. Next, block 808 illustrates searching the method cache with the hash index. Thereafter, block 810 illustrates a determination whether there is a cache hit for the hash index in the method cache. If there is not a cache hit, then the process passes to block 818. Block 818 depicts executing the method and caching the result in the method cache at the hash index. Next, block 820 illustrates returning execution control of the method to the virtual machine controller or interpreter controller, and the process ends.

Otherwise, returning to block 810 if there is a cache hit, then the process passes to block 812. Block 812 illustrates inspecting the timestamp for the entry. In one example, the method cache may include a timestamp stored with the method result entry. In another example, the cache comparison unit may access the cache property file for a timestamp or prompt the user to select a timestamp. Next, block 814 depicts a determination whether the cache entry for the method is valid because based on the timestamp the data has not become stale. If the cached entry is not valid, then the process passes to block 818. If the cached entry is valid, then the process passes to block 816. Block 816 illustrates using the cached result for the method, and the process passes to block 820.

While the invention has been particularly shown and described with reference to a preferred embodiment, it will be understood by those skilled in the art that various changes in form and detail may be made therein without departing from the spirit and scope of the invention.

What is claimed is:

1. A system for supporting method level caching by a runtime machine, comprising:
    a disk space of a computer system comprising at least one type of memory;
    an operating system for controlling allocations and access within the disk space;
    the operating system for allocating a selected virtual disk space from among the disk space to a runtime machine for management by the runtime machine only;
    a runtime machine for running at least one application through at least one of the operating system or on at least one processor of the computer system, the runtime machine for managing the selected virtual disk space from among the disk space allocated to the runtime machine by the operating system, the runtime machine for managing a separate method cache within the selected virtual disk space separate from an application heap within the selected virtual disk space, wherein the runtime machine implemented within a third stack layer only comprises a method support layer implemented within the third stack layer only comprising a cache comparison unit and an interpreter for controlling method caching by the runtime machine and wherein a stack operating on the computer system comprises a first stack layer comprising the disk space which comprises the virtual disk space, a second stack layer atop the first stack layer comprising the operating system, the third stack layer atop the second stack layer comprising the runtime machine only, a fourth stack layer atop the third stack layer comprising applications which further comprises middleware comprising a Websphere service software layer atop which the at least one application runs, and a fifth stack layer atop the fourth stack layer comprising an application programming interface;
    the interpreter of the runtime machine, responsive to determining at least one method of the application is suitable for caching, for passing execution control of the at least one method to the cache comparison unit;
    the cache comparison unit of the runtime machine for executing the at least one method and controlling caching within the method cache of a separate result of at least one method of the application suitable for caching; and
    the cache comparison unit of the runtime machine for accessing the cached separate result of the at least one method for a next instance of the at least one method from the method cache.

2. The system according to claim 1, further comprising:
    the runtime machine for compiling the source code of the application into bytecode; and
    the runtime machine while compiling the source code of the application into bytecode for detecting the at least one method, determining whether the at least one method is a candidate for caching, and marking the at least one method as cache capable within the bytecode if the at least one method is a candidate for caching.

3. The system according to claim 1, further comprising:
    the runtime machine for executing at least one of source code and compiled bytecode for the application at runtime, detecting a current method in the at least one of the source code and compiled bytecode, determining whether the current method is suitable for caching, and marking the current method as cache capable within the at least one of the source code and compiled bytecode if the current method is suitable for caching.

4. The system according to claim 1, further comprising:
    the runtime machine for reading the at least one method within the application to determine whether the at least one method is marked as cache capable through at least one of a tagged interface, an annotation, and a class-level modifier.

5. The system according to claim 1, further comprising:
    the runtime machine for supporting a user interface;
    the runtime machine for prompting a user via the user interface with a list of methods for the application; and
    the runtime machine, responsive to the user selecting one or more of the list of methods for the application as cache capable, for marking the selected methods as cache capable in the application code run by the runtime machine for the application.

6. The system according to claim 1, further comprising:
    the runtime machine for accessing a cache property file stored in a storage location separate from the application;
    the cache property file for specifying a selection of methods of the application for marking as cache capable; and
    the runtime machine for marking the selection of methods of the application as cache capable in the application code run by the runtime machine for the application.

7. The system according to claim 1, wherein the runtime machine for accessing the cached separate result of the method for a next instance of the at least one method from the method cache, further comprises:
    the runtime machine, responsive to detecting the at least one method is cache capable, for performing a hashing function to calculate a hash index for the at least one method using at least one object graph of at least one argument of the at least one method as inputs to the hashing function;

the runtime machine for searching the method cache with the hash index;

the runtime machine, responsive to detecting a cache hit to the hash index, for determining whether the method entry is valid;

the runtime machine, responsive to determining that the method entry is valid, for using the method entry from the method cache as the result of the at least one method;

the runtime machine, responsive to determining that the method entry is not valid, for executing the at least one method and caching the result of the at least one method execution in the method cache at the hash index location; and the runtime machine, responsive to detecting a cache miss to the hash index, for executing the at least one method and caching the result of the at least one method execution in the method cache at the hash index location.

8. A method for supporting method level caching by a runtime machine, comprising:

managing a selected virtual disk space from among the disk space allocated to the runtime machine by an the operating system for management by the runtime machine only and for managing a separate method cache within the selected virtual disk space separate from an application heap within the selected virtual disk space;

running, by the runtime machine, at least one application through at least one of the operating system or on at least one processor of the computer system, wherein the runtime machine implemented within a third stack layer only comprises a method support layer implemented within the third stack layer only comprising a cache comparison unit and an interpreter for controlling method caching by the runtime machine and wherein a stack operating on the computer system comprises a first stack layer comprising the disk space which comprises the virtual disk space, a second stack layer atop the first stack layer comprising the operating system, the third stack layer atop the second stack layer comprising the runtime machine only, a fourth stack layer atop the third stack layer comprising applications which further comprises middleware comprising a Websphere service software layer atop which the at least one application runs, and a fifth stack layer atop the fourth stack layer comprising an application programming interface;

responsive to the interpreter of the runtime machine determining at least one method of the application is suitable for caching, passing execution control of the at least one method from the interpreter to the cache comparison unit;

controlling, by the cache comparison unit of the runtime machine, executing the at least one method and caching within the method cache of a separate result of at least one method of the application suitable for caching; and accessing, by the cache comparison unit of the runtime machine, the cached separate result of the at least one method for a next instance of the at least one method from the method cache.

9. The method according to claim 8, further comprising:
responsive to the runtime machine compiling the source code of the application into bytecode:
detecting the at least one method within the application;
determining whether the at least one method is a candidate for caching; and
marking the at least one method as cache capable within the bytecode if the at least one method is a candidate for caching.

10. The method according to claim 8, further comprising:
executing, by the runtime machine, application code for the application at runtime by detecting a current method in the application code;
determining, by the runtime machine, whether the current method is suitable for caching; and
marking, by the runtime machine, the current method as cache capable within the application code if the current method is suitable for caching.

11. The method according to claim 8, further comprising:
reading, by the runtime machine, the at least one method within the application to determine whether the at least one method is marked as cache capable through at least one of a tagged interface, an annotation, and a class-level modifier.

12. The method according to claim 8, further comprising:
prompting a user via the user interface with a list of methods for the application; and
responsive to the user selecting one or more of the method within the list of methods for the application as cache capable, marking by the runtime machine the selected methods as cache capable in the application code run by the runtime machine for the application.

13. The method according to claim 8, further comprising:
accessing a cache property file stored in a storage location separate from the application;
reading a selection of methods of the application for marking as cache capable from cache capable settings in the cache property file; and
marking the selection of methods of the application as cache capable in the application code run by the runtime machine for the application.

14. The method according to claim 8, wherein accessing the cached separate result of the method for a next instance of the at least one method from the method cache, further comprises:
responsive to detecting the at least one method is cache capable, performing a hashing function to calculate a hash index for the at least one method using at least one object graph of at least one argument of the at least one method as inputs to the hashing function;
searching the method cache with the hash index;
responsive to detecting a cache hit to the hash index, determining whether the method entry is valid;
responsive to determining that the method entry is valid, using the method entry from the method cache as the result of the at least one method;
responsive to determining that the method entry is not valid, executing the at least one method and caching the result of the at least one method execution in the method cache at the hash index location; and
responsive to detecting a cache miss to the hash index, executing the at least one method and caching the result of the method execution in the method cache at the hash index location.

15. A program product comprising a storage-type computer-usable medium including a computer-readable program for supporting method level caching by a runtime machine, wherein the computer-readable program when executed on a computer cause the computer to:

manage a selected virtual disk space from among the disk space allocated to the runtime machine by an operating system for management by the runtime machine only for managing a separate method cache within the selected virtual disk space separate from an application heap within the selected virtual disk space;

run at least one application through at least one of the operating system or on at least one processor of the computer system, wherein the runtime machine implemented within a third stack layer only comprises a method implemented within the third stack layer only comprising a cache comparison unit and an interpreter for controlling method caching by the runtime machine and wherein a stack operating on the computer system comprises a first stack layer comprising the disk space which comprises the virtual disk space, a second stack layer atop the first stack layer comprising the operating system, the third stack layer atop the second stack layer comprising the runtime machine only, a fourth stack layer atop the third stack layer comprising applications which further comprises middleware comprising a Websphere service software layer atop which the at least one application runs, and a fifth stack layer atop the fourth stack layer comprising an application programming interface;

responsive to the interpreter of the runtime machine determining at least one method of the application is suitable for caching, pass execution control of the at least one method from the interpreter to the cache comparison unit;

execute the at least one method, by the cache comparison unit, and control caching within the method cache of a separate result of at least one method of the application suitable for caching; and access, by the cache comparison unit, the cached separate result of the at least one method for a next instance of the at least one method from the method cache.

16. The program product of claim 15, wherein said computer-readable program is transmitted over a network.

17. The program product of claim 15, wherein the computer-readable program when executed on the computer further causes the computer to:
    detect the at least one method within the source code of the application being compiled into bytecode;
    determine whether the at least one method is a candidate for caching; and
    mark the at least one method as cache capable within the bytecode if the at least one method is a candidate for caching, wherein the byte code is executed at runtime.

18. The program product of claim 15, wherein the computer-readable program when executed on the computer further causes the computer to:
    detect a current method in application code of the application when executed at runtime;
    determine whether the current method is suitable for caching; and
    mark the current method as cache capable within the application code if the current method is suitable for caching.

19. The program product of claim 15, wherein the computer-readable program when executed on the computer further causes the computer to:
    prompt a user via the user interface with a list of methods for the application; and
    responsive to the user selecting one or more of the method within the list of methods for the application as cache capable, mark the selected methods as cache capable in the application code run by the runtime machine for the application.

\* \* \* \* \*